United States Patent
Farrar et al.

(10) Patent No.: US 6,205,723 B1
(45) Date of Patent: Mar. 27, 2001

(54) QUICK RELEASE SACRIFICIAL SHIELD FOR WINDOW ASSEMBLY

(75) Inventors: Jerry L. Farrar, Banning; Jesse E. Shepard, Corona, both of CA (US)

(73) Assignee: Transit Care, Inc., Murrieta, CA (US)

( * ) Notice: Subject to any disclaimer, the term of this patent is extended or adjusted under 35 U.S.C. 154(b) by 0 days.

(21) Appl. No.: 09/186,513

(22) Filed: Nov. 4, 1998

(51) Int. Cl.⁷ ..................................................... E06B 3/26
(52) U.S. Cl. ............................. 52/202; 52/208; 52/204.5; 52/204.597; 52/204.7; 49/62; 49/469.1
(58) Field of Search ........................... 52/202, 203, 208, 52/204.5, 204.1, 205.597, 204.51, 204.62, 204.7, 204.59 J; 49/62, 63, 489.1, 495.1, 496.1, 463; 296/146.1 J

(56) References Cited

U.S. PATENT DOCUMENTS

| | | | |
|---|---|---|---|
| 3,959,941 | * 6/1976 | Smith | 52/400 |
| 4,364,209 | * 12/1982 | Gebhard | 52/208 |
| 4,478,003 | * 10/1984 | Flett | 49/63 |
| 4,823,511 | * 4/1989 | Herliczek et al. | 49/404 |
| 5,062,248 | * 11/1991 | Kunert | 52/208 |
| 5,242,207 | * 9/1993 | Carson et al. | 296/146.15 |
| 5,396,746 | * 3/1995 | Whitmer | 52/208 |
| 5,735,089 | * 4/1998 | Smith et al. | 52/202 |
| 5,809,707 | * 9/1998 | Bargados et al. | 52/204.62 |

* cited by examiner

Primary Examiner—Carl D. Friedman
Assistant Examiner—Yvonne Horton
(74) Attorney, Agent, or Firm—Knobbe, Martens, Olson & Bear, LLP.

(57) ABSTRACT

A window assembly in which the frame of the window assembly provides support for both a window and a protective shield with such support comprising an inwardly facing saddle which supports the window within the frame and an inwardly facing casing and retainer adjacent the saddle which releasably retains the protective shield and the window within the frame with the shield extending over and protecting the window.

12 Claims, 2 Drawing Sheets

QUICK RELEASE SACRIFICIAL SHIELD FOR WINDOW ASSEMBLY

FIELD OF INVENTION

The present invention relates to window assemblies and apparatus for protecting the interior of such windows and, more particularly, to an improved quick release sacrificial shield for protecting window assemblies.

BACKGROUND

U.S. Pat. Nos. 5,242,207 and 5,735,089 describe and illustrate window protectors comprising the current state of the art and are incorporated herein by this reference.

While it has been recognized that the protective shields for window assemblies such as shown in the foregoing patents should be easily attachable to and detachable from window assemblies, there is still a need for improvements in connecting structures better enabling such easy attachment and detachment. The present invention satisfies such needs.

SUMMARY OF INVENTION

In the present invention, the frame of the window assembly provides support for both the window and the protective shield. Such support comprises an inwardly facing saddle which supports the window within the frame and an inwardly facing casing and retainer adjacent the saddle which releasably retains the protective shield and the window within the frame with the shield extending over and protecting the window.

DETAILED DESCRIPTION OF INVENTION

Figure 1:
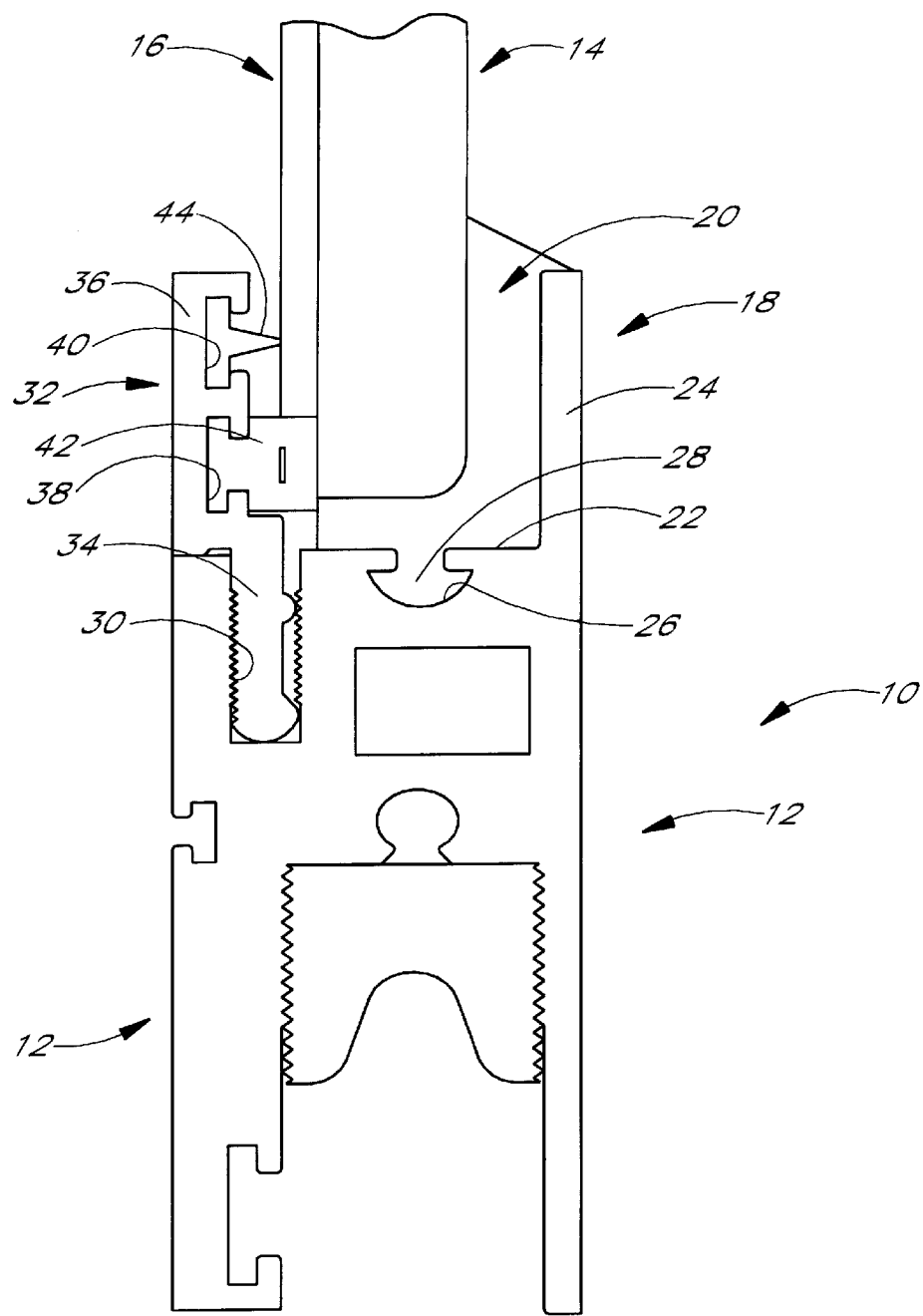
FIG. 1 is a fragmentary sectional side view of one embodiment of a window assembly constructed in accordance with the present invention.
Figure 2:
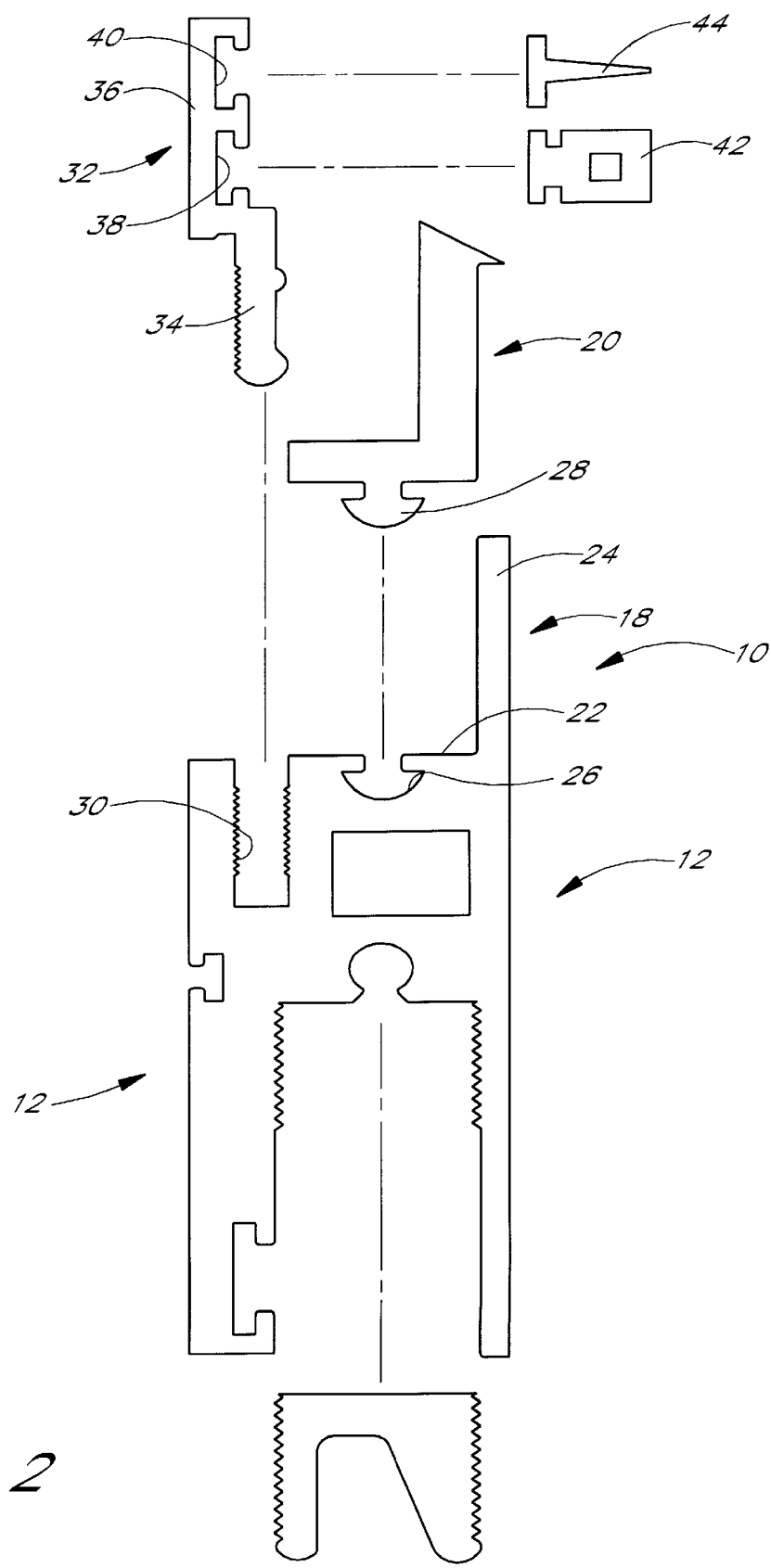
FIG. 2 is an exploded view of the components comprising the window assembly of the present invention as shown in FIG. 1.

As depicted in FIGS. 1 and 2, the window assembly 10 of the present invention comprises a rectangular or differently shaped closed frame 12 preferably of metal or rigid plastic for supporting a window 14 and a protective shield 16 for the window within the confines of the frame. The frame 12 comprises sides having an inwardly facing elongated L-shaped saddle 18 supporting an elongated L-shaped window seal 20. The saddle 18 comprises a transverse base 22 for receiving and supporting a corresponding base of the seal 20 and an inwardly extending leg 24 substantially normal to the base for receiving and providing lateral support for a corresponding leg of the seal 20. Preferably, the base 22 includes an elongated mushroom-shaped channel 26 for receiving a corresponding extension 28 from the seal 20 to interlock the seal to the saddle 18. As illustrated in FIG. 1, the leg 24 of the saddle 18 and the corresponding leg of the seal 20 provide side support and an edge seal for an outside and marginal edge of the window 14 in the frame 12.

In addition to the saddle 18 as described, the sides of the frame 12 include an elongated casing 30 in the base of the saddle for releasably receiving an elongated combination retainer 32 for the window 12 and shield 16. As illustrated, the retainer 32 is a vertically extending clip member having a lower vertically extending leg 34 shaped to fit tightly into the casing 30 with an upper vertically extending leg 36 extending substantially parallel to an inside of the window 14 and shield 16 when mounted in the window assembly 10.

Preferably, the retainer 32 is formed of a resilient material such as a plastic or composite material and the lower leg includes a serrated portion mating with a serrated interior of the casing 30 to tightly yet releasably secure the retainer to the saddle 18 and to the frame 12. Also, the upper leg 36 of the retainer 32 preferably includes elongated vertically spaced side cavities 38 and 40 for releasably receiving an elongated window seal 42 and elongated shield seal 44 respectively. As illustrated in FIG. 1, in the window assembly 10 the seal 42 bears against an inside edge of window 12 whereby the window is sealed at its inside, outside and marginal edges between the seal 20 and seal 42. As also illustrated in FIG. 1, in the window assembly 10 the seal 44 bears against an inside edge of the shield 16 as it rests on a surface of the seal 42 whereby the shield is sealed at its inside and marginal edges between the seals 42 and 44.

From the foregoing description, it should be appreciated that the assembly and disassembly of the window assembly 10 and the attachment and removal of the protective shield 16 over the window 14 is easy and rapid. In particular, in assembly of the window assembly 10, the seal 20 is easily attached to the saddle 18 via the mushroom connections readying the frame 12 for reception of the window 14. With the window in place, the shield 16 and combination retainer 32 are inserted into the frame with the lower leg 34 of the retainer seating in the casing 32. The removal of the shield is easily accomplished by pulling the retainer 32 and the lower leg 34 from the casing 32 to free the shield from the frame 12.

What is claimed is:

1. A window assembly comprising:
   a window;
   a protective shield for the window;
   a frame supporting the window and the shield, the frame including an inwardly facing saddle which supports the window within the frame, the frame further including a retainer adjacent the saddle which releasably retains the shield and the window within the frame with the shield extending over and protecting the window, the retainer comprising an essentially rigid material with at least a portion of the retainer extending over and protecting at least a portion of the shield wherein the retainer is a vertically extending leg shaped to fit tightly into the casing with an upper vertically extending leg extending substantially parallel to an inside of the window and shield when mounted in the window assembly and wherein the lower leg of the retainer includes a serrated portion mating with a serrated interior of the casing to tightly yet releasably secure the retainer to the saddle and to the frame and wherein the upper vertically extending leg of the retainer includes elongated vertically spaced side cavities for releasably receiving an elongated second window seal and an elongated shield seal respectively;
   a first window seal sup ported by the saddle for engaging and supporting the window ; and
   an elongated casing in the saddle for releasably receiving at least a portion of the retainer.

2. The assembly of claim 1 wherein:
   the upper leg of the retainer includes elongated vertically spaced side cavities for releasably receiving an elongated second window seal and an elongated shield seal, respectively.

3. The assembly of claim 2 wherein:
the second window seal bears against an inside edge of the window whereby the window is sealed at its inside, outside and marginal edges between the first and second window seals.

4. The assembly of claim 3 wherein:
the shield seal bears against an inside edge of the shield as it rests on a surface of the second window seal whereby the shield is sealed at its inside and marginal edges between the second window and shield seals.

5. The assembly of claim 1, wherein the retainer is comprised of metal.

6. The assembly of claim 1, wherein the retainer is comprised of rigid plastic.

7. The assembly of claim 1, wherein the retainer is comprised of composite material.

8. The assembly of claim 1, wherein the retainer and the saddle are comprised of at least one similar material.

9. The assembly of claim 1, wherein the retainer is comprised of a material having a greater rigidity than the first window seal.

10. A window assembly comprising:
a window;
a protective shield for the window,
a frame supporting the window and the shield and including an inwardly facing saddle which supports the window within the frame and an inwardly facing casing and retainer adjacent the saddle which releasably retains the shield and the window within the frame with the shield extending over and protecting the window,
a first window seal supported by the saddle for engaging and supporting the window; and
the inwardly facing casing in the saddle releasably receiving an elongated combination retainer for the window and shield, wherein
the retainer comprises a vertically extending clip member having a lower vertically extending leg shaped to fit tightly into the casing with an upper vertically extending leg extending substantially parallel to an inside of the window and shield when mounted in the window assembly,
the lower leg of the retainer including a serrated portion mating with a serrated interior of the casing to tightly yet releasably secure the retainer to the saddle and to the frame, and
the upper leg of the retainer including elongated vertically spaced side cavities for releasably receiving an elongated second window seal and an elongated shield seal, respectively.

11. The assembly of claim 10 wherein:
the second window seal bears against an inside edge of the window whereby the window is sealed at its inside, outside and marginal edges between the first and second window seals.

12. The assembly of claim 11 wherein:
the shield seal bears against an inside edge of the shield as it rests on a surface of the second window seal whereby the shield is sealed at its inside and marginal edges between the second window and shield seals.

* * * * *